J. Orm,

Saw Swage.

No. 106,978.  Patented Aug. 30, 1870.

Witnesses:
Newton Crawford
John F. Fennell

Inventor:
John Orm

J. Orm,

Saw Swage.

No. 106,978. Patented Aug. 30, 1870.

2 Sheets, Sheet 2.

Witnesses:
Newton Crawford
John F. Fennell.

Inventor:
John Orm

UNITED STATES PATENT OFFICE.

JOHN ORM, OF PADUCAH, KENTUCKY.

IMPROVEMENT IN MACHINE FOR ELONGATING AND SPREADING SAW-TEETH.

Specification forming part of Letters Patent No. 106,978, dated August 30, 1870.

*To all whom it may concern:*

Be it known that I, JOHN ORM, of Paducah, in the county of McCracken, State of Kentucky, have invented a new and useful Machine for Elongating, Swaging, or Spreading Saw-Teeth; and I do hereby declare that the following is a full, clear, and exact description of the construction and operation of the same, reference being had to the annexed drawings, making a part of this specification.

Figure 3:
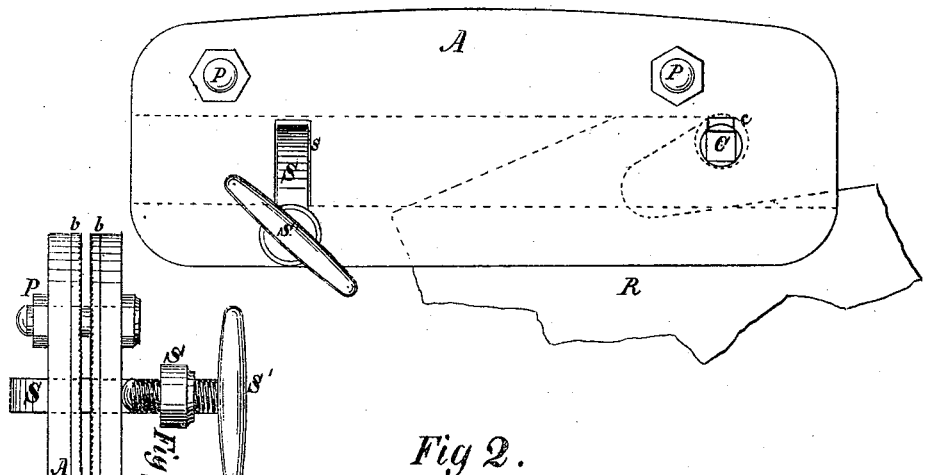
Figure 2:
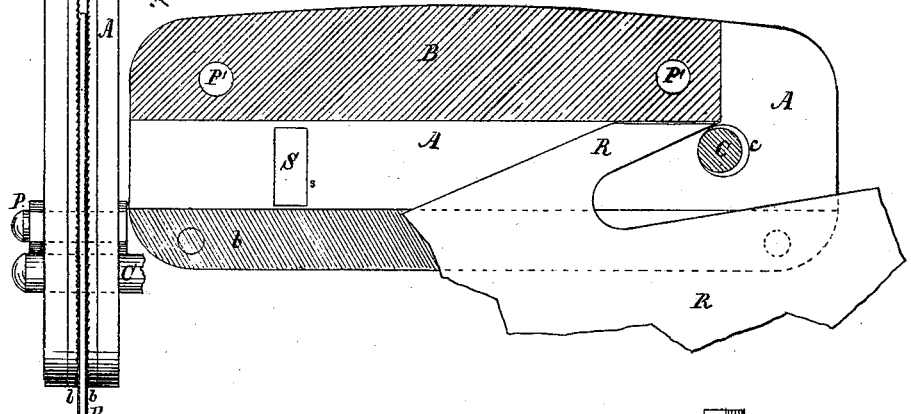
Figure 1:
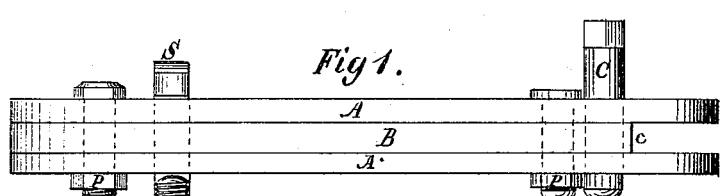
Figure 4:
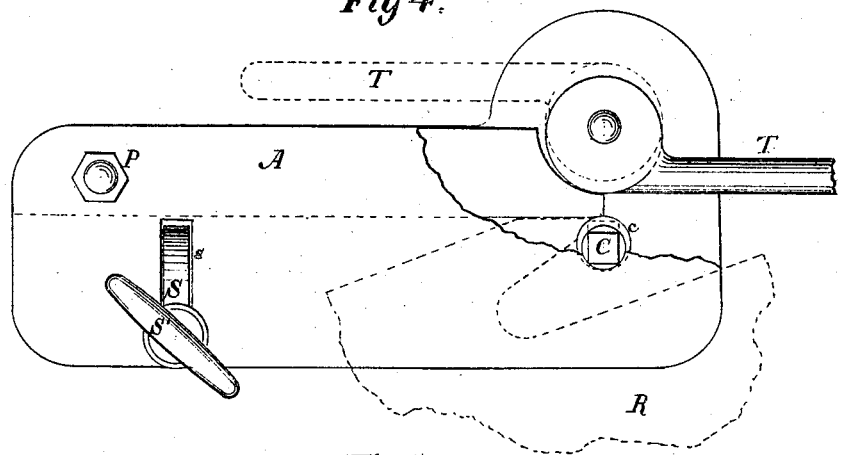
Figure 5:
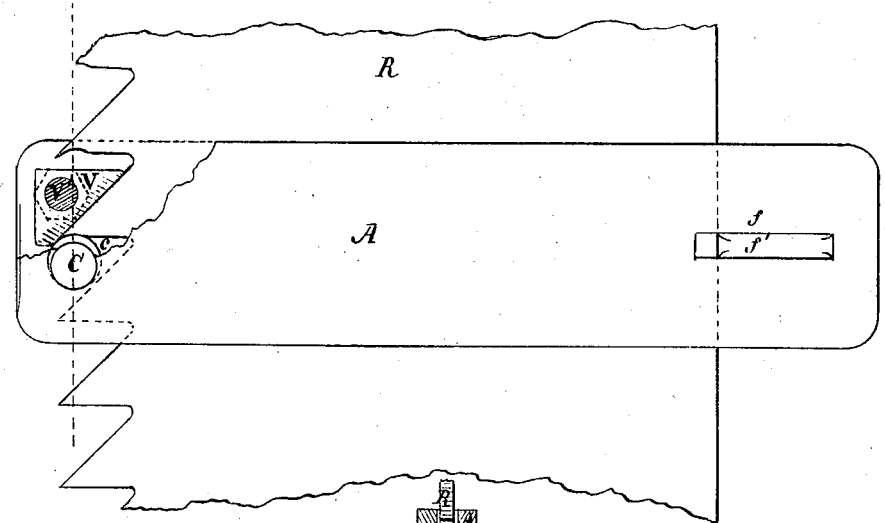
Figure 6:
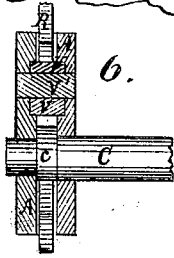

Figure 1 is a top view of the machine. Fig. 2 is a side view of the same, with the side plate removed, and a section of a saw with a tooth in position to be acted upon. Fig. 3 is a side view, with a section of a saw having a tooth in position to be acted upon, in dotted lines. Fig. 4 is a view of Fig. 3, with the addition of an eccentric adjusting-lever applied to the back piece of the machine. Fig. 5 is a modification of the machine, in which the teeth of reciprocating saws can be acted upon. Fig. 6 is a sectional edge view of the actuating parts of the same, and Fig. 7 is an edge view of Fig. 2.

The object of this invention is to produce a machine in which the teeth of saws (either circular or reciprocating) are acted upon in such manner as that the teeth shall be lengthened or drawn out, swaged wider at their points and upon their bottom or forward edge, and at the same time have the point or cutting-edge project below or forward of the right line of the front edge of the saw-tooth; and it consists in the construction and arrangement of the actuating parts that produce such result.

A A are the sides of the machine, formed from plates or bars of metal, with proper bolt-holes and holes for the admission of the shaft of the eccentric and holding-clamp. B is a back or center piece between the side plates, that serves, when in position, to keep the side plates in place and form a sufficient space between plates A for the admission of the saw-plate, holding-jaws, and the eccentric-shaft. P P are the screw-bolts that pass through holes P' in the plate A and serve to hold the plates in their proper position. *b b* are two holding-jaws, that have serrated faces next each other, for the holding the saw and prevent its slipping while the teeth are being acted upon, and they are riveted or otherwise secured to plates A A, as seen in Fig. 7 on Sheet 1. *s* is a slot or mortise in plates A to admit the clamp S, which is a strong bent piece of metal bar passing through plates A and embracing them, and having a screw-nut on one end, that receives the clamping-screw S'.

C is a shaft passing through and journaled in the side plates A. Upon this shaft C, and so as to come between plates A, is an eccentric, *c*, larger in diameter than the shaft, and the difference in the diameter projects from one side of the center of the shaft C, as seen in the several figures of the drawings. R is a section or portion of a saw, with a tooth in position to be operated upon by the eccentric *c*.

When a circular saw is placed between plates A A and the outer edge of a tooth against the back piece B, the saw clamped firmly by turning clamp-screw hard up against plate A, the shaft C, with the eccentric *c*, in the position seen in Fig. 2, then, by turning the shaft C, with the eccentric *c*, forward once around, the eccentric *c* comes hard in contact with the forward or under edge of the tooth, and, as it is turned around, forces the metal toward the point of the saw, and at the same time spreads the point of the tooth in width upon its forward or lower edge, where the greatest width is needed in sawing timber, and causes the tooth, at its point, to assume the shape seen in side view in Fig. 5.

This operation not only spreads the tooth in its thickness at the point, but increases its length and gives it the best possible shape for cutting easily the wood that a saw must cut in sawing lumber. Hence the result is entirely different from any other method of swaging within my knowledge, as, where swaging has been practiced on saws, the result has generally been to upset the teeth, making them shorter in length, in order to give proper width to the tooth at its point, thus tending to reduce the diameter of the saw faster than the natural wear by use, while by my method the tooth is lengthened from the action of the eccentric in giving form to the point of the tooth, and at the same time made thicker where the eccentric has acted upon the tooth.

It will be seen that the cutting-edge of the tooth, as left by the action of the eccentric, is made to be below or forward of the line of the bottom edge of the tooth, as seen in Fig. 5, and thereby forming a hooked cutting-edge, which cuts the wood with which it comes in contact like or upon the principle that a chisel cuts its way into the timber when driven.

In order to adjust the back piece B so that different sized and shaped teeth can be acted upon by the eccentric c, an eccentric-lever, T, can be applied thereto, as seen in Fig. 4, which will adjust and gage the back piece to any shape or size of tooth that may be used.

To adapt the revolving eccentric to be used to bring the teeth of reciprocating saws to a similar shape, the machine is modified as represented in Figs. 5 and 6, where the plates A are longer and the shaft C, with eccentric c, located differently than in the machine above described, but does not vary the action of the parts that effect the object aimed at. In this case the saw R is placed between plates A in a transverse direction, and near one end of said plates is a screw-bolt, V', passing through plates A, and upon this bolt and between the plates A is block V, which fits upon the upper side of the tooth, and so that the point of the tooth shall have the same relation to the shaft C and eccentric c that is shown in Figs. 2, 3, and 4, when the eccentric is turned once, and the point of the tooth is formed as above described.

If the teeth of saws vary in size or shape, it is only necessary to have the block V of such size and shape as will exactly fit the outer edge of the tooth.

At the back ends of plates A is a mortise, f, in which is a key, f', which is driven against the back edge of the saw, which will hold the saw to its proper position with relation to the block V and shaft C.

Having thus described my invention, what I claim, and desire to secure by Letters Patent, is—

1. The revolving eccentric saw-swage C c for elongating, swaging, and shaping the teeth of saws, in the manner shown.

2. The revolving eccentric C c, in combination with the plates A, back piece B, holding-jaws b b, and clamping device S, when constructed in the manner and for the purpose shown.

JOHN ORM.

Witnesses:
GEORGE LANGSTAFF,
JAS. LANGSTAFF, Jr.